No. 634,209. Patented Oct. 3, 1899.
F. T. GILES.
APPARATUS FOR MANUFACTURING THREADED ARTICLES.
(Application filed Feb. 15, 1899.)

(No Model.) 3 Sheets—Sheet 2.

Witnesses. Inventor.

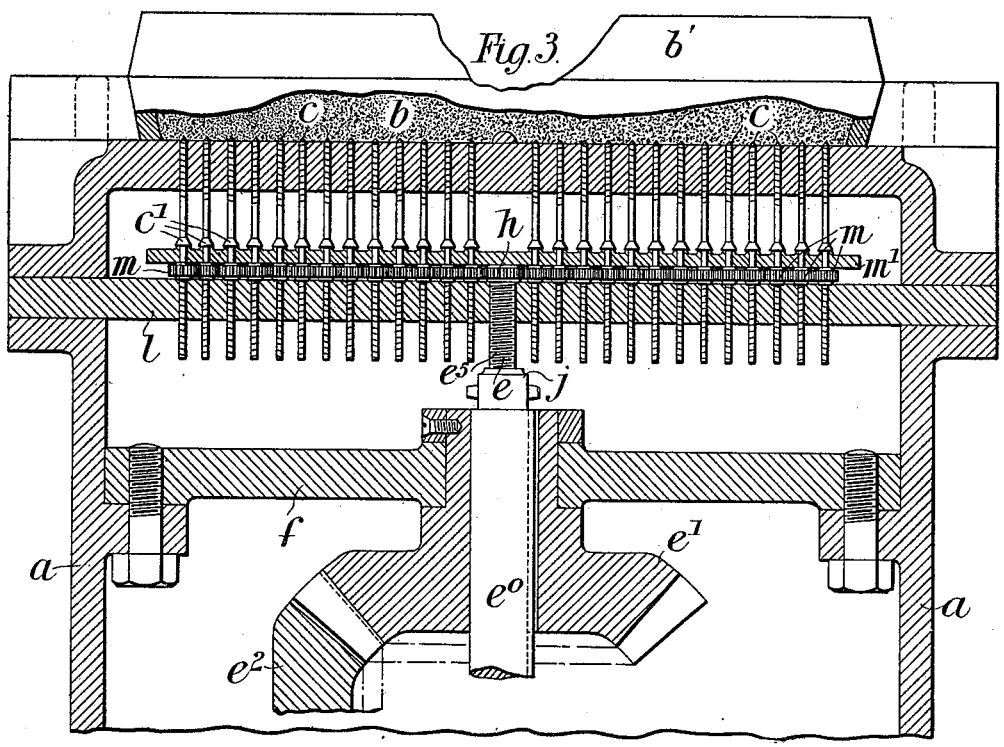

UNITED STATES PATENT OFFICE.

FREDERICK THEOPHILUS GILES, OF BRISTOL, ENGLAND.

APPARATUS FOR MANUFACTURING THREADED ARTICLES.

SPECIFICATION forming part of Letters Patent No. 634,209, dated October 3, 1899.

Application filed February 15, 1899. Serial No. 705,553. (No model.)

*To all whom it may concern:*

Be it known that I, FREDERICK THEOPHILUS GILES, a subject of the Queen of Great Britain, residing at Bristol, England, have invented new and useful Improvements in Apparatus for the Manufacture of Threaded Articles, of which the following is a specification.

My invention relates to apparatus for the manufacture of screws, also bolts, nails, shoe-rivets and shoe-bills, boot-protectors, and similar articles made of cast metal and having spiral, twisted, or screw shanks, stems, or prongs, the object of my invention being to provide improved means for operating the spiral or twisted or screw-pattern stems used for molding the shanks, stems, or prongs for the purpose of forcing them to the required distance through holes in the molding-plate for sand or other suitable material to be molded on or around them or for forcing them into the molded sand or other material, and in either case withdrawing them therefrom.

Figure 1:
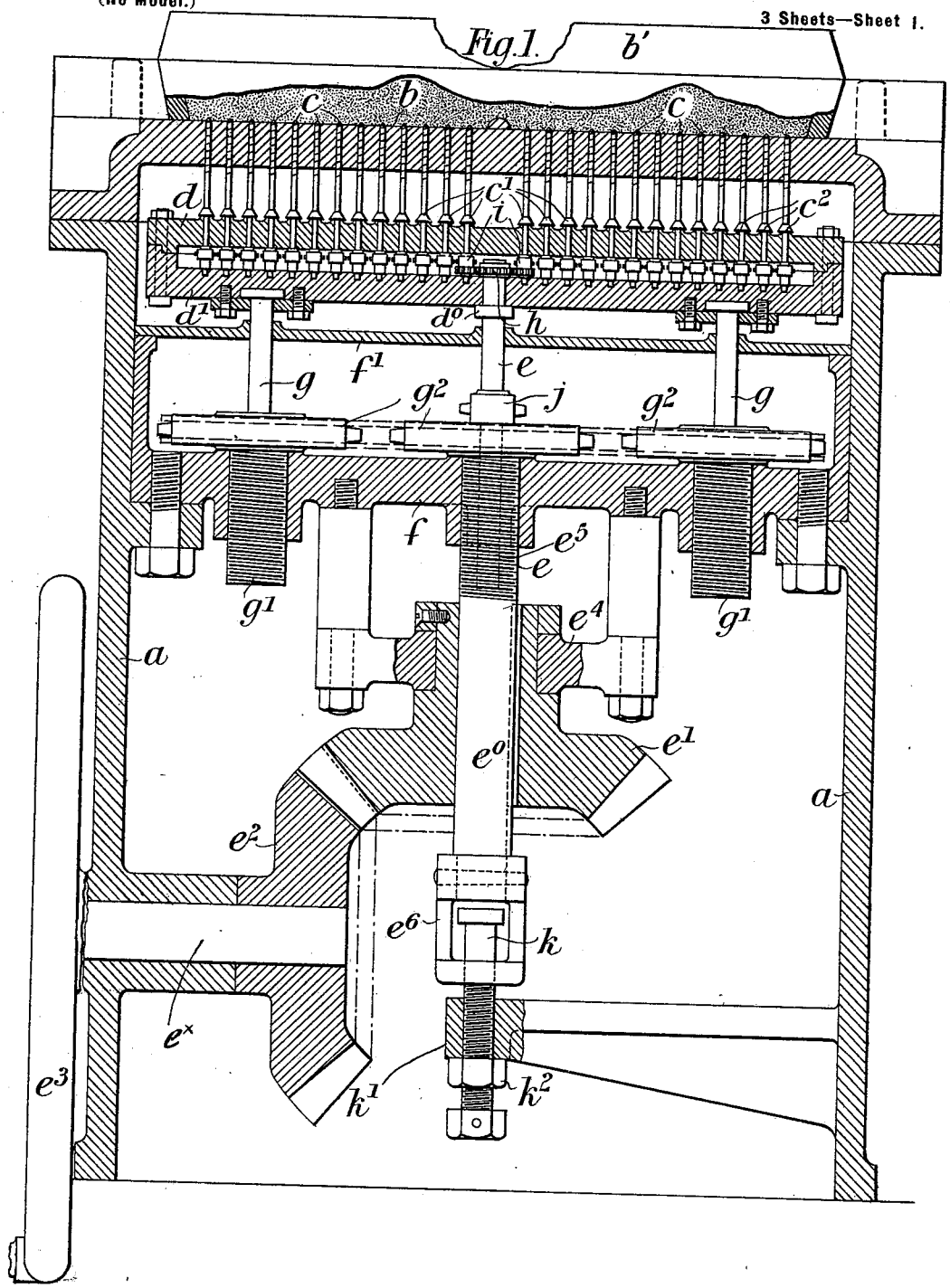
Figure 2:
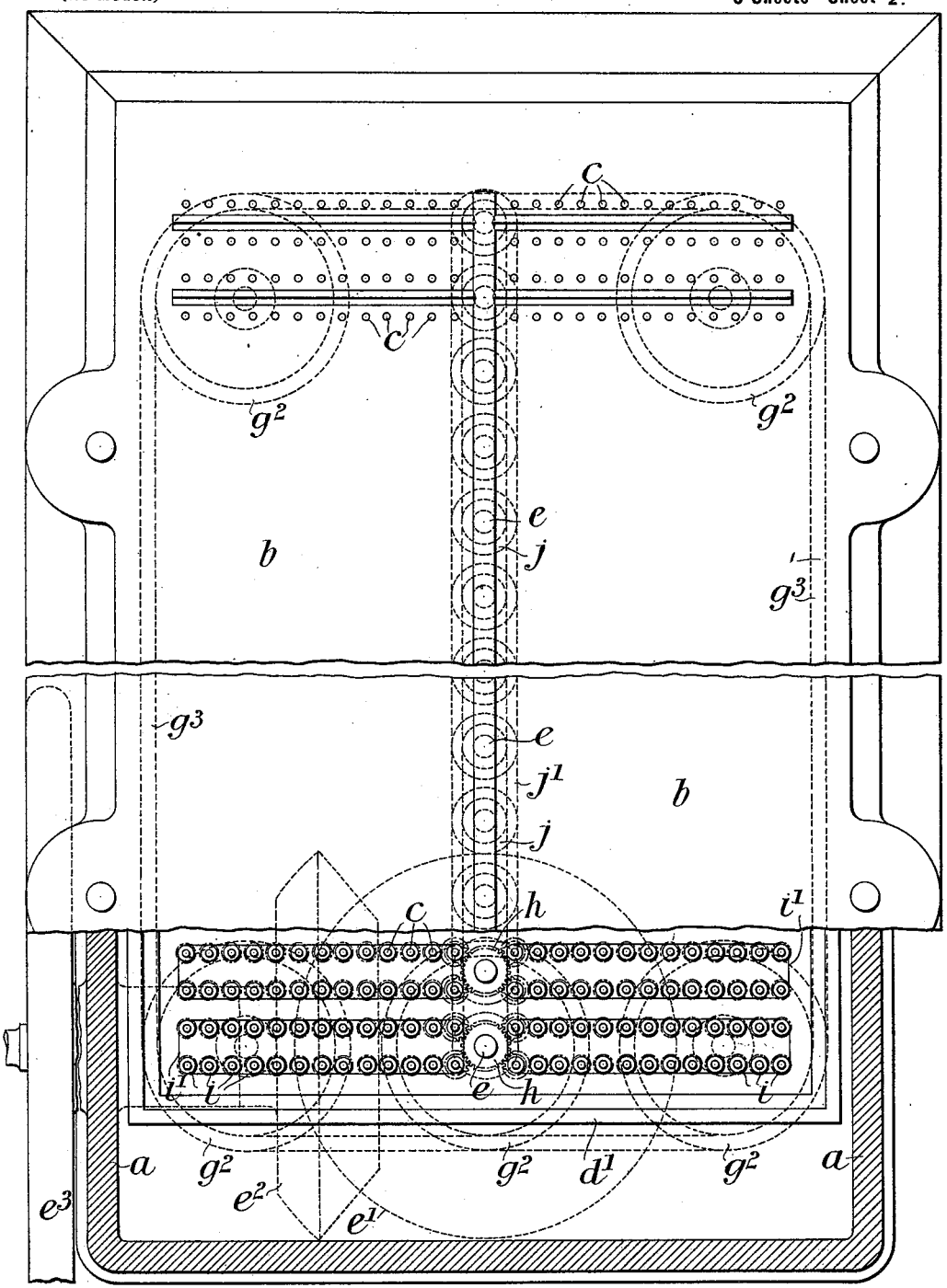

In the accompanying drawings, Figure 1 is a vertical section of apparatus made according to the invention for the production of spiral or twisted or screw shanks. Fig. 2 represents a top plan view of the apparatus, the central portion being broken away and a portion of the molding-plate at one end being broken away to show the parts located beneath. Fig. 3 is a vertical section illustrating a modified construction of apparatus.

In carrying out the invention I provide a machine wherein all the pattern-stems are mounted in such a manner that they can have imparted to them simultaneously an axial movement and a rotary movement.

Referring first to the arrangement illustrated in Figs. 1 and 2, $a$ is the frame supporting the apparatus. $b$ is the molding-plate, which is perforated in the usual manner for the passage of the pattern-stems $c\ c$, and $b'$ is the molding box or flask. These stems $c\ c$ are carried by a support composed of two plates $d\ d'$, having a space between them. The said pattern-stems $c\ c$ pass through the upper plate $d$ and are carried in holes in the upper face of the plate $d'$ in such a manner that they can revolve in the said support $d\ d'$, but partake of the up-and-down movement given to the said support $d\ d'$, in the manner hereinafter described.

The pattern-stems are arranged in rows or sprays in the usual manner, transversely to the machine, which may contain any suitable number of such rows. In connection with each row a vertical spindle $e$ is rotatably mounted in the frame. One of the vertical spindles $e$, which I term the "driving-spindle," preferably at one end of the apparatus, as shown clearly in Fig. 2, is extended downward, as at $e^0$, but with increased diameter, and is provided at its lower end with a bevel-wheel $e'$, which is secured upon it by a sliding feather and a keyway in such a manner that the rotation of the bevel-wheel $e'$, through the medium of the bevel-wheel $e^2$ and hand-wheel $e^3$ on an operating-shaft $e^\times$, causes the spindle $e$ to rotate, but also allows it axial movement.

The bevel-wheel $e'$ is rotatably mounted in a support $e^4$, which is suspended from a plate $f$, fixed to the frame $a$ of the machine. The spindle $e$ is screw-threaded, as shown at $e^5$, above the bevel-wheel $e'$, the screw-threaded portion passing through a female screw formed in the fixed plate $f$. The upper end of each spindle $e$ passes up through the plate $d'$ and has a supporting-collar $d^0$, bearing against the under side thereof. With this arrangement it will be obvious that the rotation of the end spindle $e$, through the medium of the bevel-wheels $e'\ e^2$ and the hand-wheel $e^3$ in the manner above mentioned, will cause the said spindle $e$ to move axially by reason of the engagement of the screw-threaded portion $e^5$ with the female screw in the plate $f$, and this axial movement of the said spindle $e$ is imparted to the support $d\ d'$ by the following arrangement: A number of spindles $g\ g$ are rotatably fitted to the under part of the plate $d'$ and extend downward to the fixed plate $f$, through which they pass, the portions passing through the said plate $f$ being of larger diameter than the rest thereof and having screw-threads $g'$, the holes in the plate $f$ through which they pass also being provided with female screw-threads. The spindle $e$ and the spindles $g\ g$ are provided with chain-wheels $g^2\ g^2$, around which passes a chain $g^3$, Fig. 2, so that the rotation of the spindle $e$ also causes the spindles $g\ g$ to rotate, the said spindles rising at the same rate as the spindle $e$, the screw-threads $e^5$ and $g'$ being of the same pitch, and thereby raising the support $d\ d'$.

To rotate each of the pattern-stems $c$ independently of the up-and-down movement given to them by the support $d\ d'$, I provide the spindles $e$ at their upper ends—that is to say, in the space left between the two plates $d\ d'$—with a toothed wheel $h$, the said toothed wheel engaging with a toothed wheel mounted upon the stem on each side thereof. Each of the stems is also provided with a small chain or sprocket-wheel $i$ in the space between the two plates $d\ d'$, around each row of which a chain $i'$ or the like passes, as clearly shown in Fig. 2. By this means it will be obvious that the rotation of the end spindle $e$ effects the rotation in the same direction of all the pattern-stems $c\ c$ in each transverse row of such stems. The bosses of the sprocket-wheels bear against the under side of the plate $d$, so that the stems $c\ c$ are forced to follow both the up and down movements of the support $d\ d'$.

It will be obvious that only the end spindle $e$ requires to be provided with the bevel driving-gear, as the whole row of spindles running lengthwise along the machine can be rotated from the end spindle by means of sprocket-wheels $j\ j$, mounted upon the said spindles and around the whole of which there passes a chain $j'$. With this arrangement it will be obvious that by raising the support $d\ d'$, so as to project the pattern-stems $c\ c$ through the molding-plate $b$ and then applying the molding-box in the usual way, filling and ramming it with sand and then turning the hand-wheel $e^3$ in the proper direction, the pattern-stems are simultaneously caused to descend and to rotate, so that the mold is furnished with a series of impressions for forming screw-threaded shanks.

In order that the extent to which the pattern-stems $c\ c$ is projected through the molding-plate $b$ can be adjusted to suit the length of stem required to be obtained, I provide the lower end of the end spindle $e$ with an eye or yoke $e^6$, which engages with a stop-pin $k$, the lower end of which is screw-threaded and passes through a bracket $k'$, so that the said stop-pin can be adjusted to any desired position and secured in the said position by means of a lock-nut $k^2$.

$c'\ c'$ are conical caps provided upon the pattern-stems $c\ c$ and fitting over bosses $c^2\ c^2$ upon the upper face of the plate $d$ for preventing the entrance of sand or other material into the mechanism in the support $d\ d'$.

$f'$ is a cover-plate fitted to the fixed plate $f$ for excluding dust, &c.

In the arrangement illustrated in Fig. 3 the lower ends of the pattern-stems $c\ c$ are screw-threaded and pass through screw-threaded holes in a fixed support $l$, so that when each stem is rotated it is also raised or lowered by the rotation of the said screw-threaded ends in the fixed plate $l$. To rotate each stem, I provide it with a toothed wheel $m$, each of the said toothed wheels in a transverse row or spray engaging with the adjacent wheels, so that the stems are rotated alternately in opposite directions, and must consequently be provided alternately with right and left handed screw-threads. In this arrangement the spindles $e$ are each provided with a screw-thread $e^5$, engaging a female screw in the plate $l$, the said screw-threads being of the same pitch as that of the lower ends of the stems $c$.

$m'$ is a plate covering the toothed wheels $m$ for keeping out the dust. If necessary, the said wheels can be made to run in an oil-bath. It will be obvious that I could in this case employ a chain and sprocket-wheels, as in the previous construction of apparatus for simultaneously rotating the pattern-stems, instead of the toothed wheels, as shown, and also that the arrangement of toothed wheels could be substituted for the chain and sprocket-wheels in the arrangement shown in Figs. 1 and 2.

Having now particularly described and ascertained the nature of my said invention and in what manner the same is to be performed, I declare that what I claim is—

1. In an apparatus for casting screw-threaded articles the combination with the molding-plate provided with a series of apertures, of a bearing-plate movable toward and from the molding-plate, a series of threaded pattern-stems journaled in said bearing-plate in line with the apertures in the molding-plate, operating devices for imparting simultaneous rotary motion to said stems, including a driving-spindle movable longitudinally with said bearing-plate, devices for moving said bearing-plate and spindle toward and from the molding-plate, and an adjustable stop for limiting the movement of said bearing-plate toward said molding-plate to regulate the length of the threaded articles to be cast, substantially as described.

2. In an apparatus for casting screw-threaded articles the combination with the molding-plate provided with a series of apertures, of a bearing-plate movable toward and from the molding-plate, a series of threaded pattern-stems journaled in said bearing-plate in line with the apertures in the molding-plate, operating devices for imparting simultaneous rotary motion to said stems, including a driving-spindle movable longitudinally with said bearing-plate, devices for moving said bearing-plate and spindle toward and from the molding-plate and an adjustable stop to engage said driving-spindle to limit the longitudinal movement of said spindle and the movement of said bearing-plate toward the molding-plate for regulating the length of the threaded articles to be cast, substantially as described.

3. In an apparatus for casting screw-threaded articles the combination with a molding-plate provided with a series of apertures, of a bearing-plate movable toward and from the molding-plate, a series of threaded pattern-stems journaled in said bearing-plate in line with said apertures in the molding-plate, means for imparting simultaneous rotary motion to said pattern-stems including a longitudinally-movable driving-spindle adapted to move with the bearing-plate, said spindle being provided with a yoke, means for rotating said spindle, devices for moving said spindle and bearing-plate toward and from the molding-plate and an adjustable stop-pin engaging said yoke for limiting the movement of said driving-spindle and said bearing-plate toward the molding-plate to regulate the length of the threaded articles, to be cast, substantially as described.

4. In an apparatus for casting threaded articles the combination with the molding-plate provided with a series of apertures, of a bearing-plate movable toward and from the molding-plate, a series of threaded pattern-stems mounted in said bearing-plate and adapted to be projected through the apertures in the molding-plate, devices for imparting simultaneous rotary motion to said pattern-stems including a longitudinally-movable driving-spindle adapted to move longitudinally with the bearing-plate, a driving-gear mounted upon said spindle to turn therewith but to permit the longitudinal movement of the spindle therethrough, a stationary bearing for said driving-gear, an operating-shaft provided with a gear meshing with said driving-gear and an adjustable stop located in position to engage said spindle to limit the longitudinal movement thereof and the movement of the bearing-plate toward the molding-plate and screw-threaded devices for moving the bearing-plate and said driving-spindle toward and from the molding-plate, substantially as described.

5. In an apparatus for casting screw-threaded articles the combination with the molding-plate provided with a series of apertures, of a stationary plate parallel to the molding-plate provided with a series of screw-threaded apertures registering with the apertures in the molding-plate, a bearing-plate movable with respect to the molding-plate and said stationary plate, a series of pattern-stems journaled in said bearing-plate provided with threaded portions adapted to pass freely through the apertures in the molding-plate and with threaded portions engaging the threaded apertures in said stationary plate, and means for imparting simultaneous rotary motion to said pattern-stems including a longitudinally-movable driving-spindle, substantially as described.

6. In an apparatus for casting threaded articles the combination with the molding-plate provided with a series of apertures, of a stationary plate parallel to the molding-plate and provided with screw-threaded apertures registering with the apertures in the molding-plate, a bearing-plate located between said parallel plate and movable toward and from the same, a series of pattern-stems journaled in said bearing-plate and provided with threaded pattern portions adapted to move freely through the apertures in the molding-plate and with screw-threaded portions engaging the threaded apertures in the said stationary plate, means for imparting simultaneous rotary motion to all of said pattern-stems, including a driving-spindle movable longitudinally and provided with a threaded portion engaging a threaded aperture in said stationary plate and a stop engaging said driving-spindle for limiting its longitudinal movement and regulating the length of the threaded articles to be cast, substantially as described.

FREDERICK THEOPHILUS GILES.

Witnesses:
ROBT. C. TUDWAY,
FRANK H. FRENCH.